(12) United States Patent
Stavrou et al.

(10) Patent No.: US 8,549,646 B2
(45) Date of Patent: Oct. 1, 2013

(54) METHODS, MEDIA AND SYSTEMS FOR RESPONDING TO A DENIAL OF SERVICE ATTACK

(75) Inventors: Angelos Stavrou, New York, NY (US); Angelos D. Keromytis, New York, NY (US); Jason Nieh, New York, NY (US); Vishal Misra, New York, NY (US); Daniel Rubenstein, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 481 days.

(21) Appl. No.: 11/584,312

(22) Filed: Oct. 20, 2006

(65) Prior Publication Data

US 2007/0214505 A1    Sep. 13, 2007

Related U.S. Application Data (60) Provisional application No. 60/729,093, filed on Oct. 20, 2005, provisional application No. 60/729,094, filed on Oct. 20, 2005, provisional application No. 60/729,116, filed on Oct. 21, 2005.

(51) Int. Cl.
 *G06F 12/14*   (2006.01)

(52) U.S. Cl.
 USPC ............... 726/24; 729/24; 709/201; 709/202; 709/203; 709/223

(58) Field of Classification Search
 USPC ................. 726/24, 23, 22; 709/201, 202, 203
 See application file for complete search history.

(56) References Cited

U.S. PATENT DOCUMENTS

| | | | |
|---|---|---|---|
| 5,359,730 A | 10/1994 | Marron | |
| 6,076,108 A | 6/2000 | Courts et al. | |
| 6,098,093 A | 8/2000 | Bayeh et al. | |
| 6,134,592 A | 10/2000 | Montulli | |
| 6,141,686 A | 10/2000 | Jackowski et al. | |
| 6,182,139 B1 | 1/2001 | Brendel | |
| 6,336,142 B1 | 1/2002 | Kato et al. | |
| 6,349,337 B1 | 2/2002 | Parsons et al. | |
| 6,366,558 B1 | 4/2002 | Howes et al. | |
| 6,442,663 B1 | 8/2002 | Sun et al. | |
| 6,567,918 B1 | 5/2003 | Flynn et al. | |
| 6,795,966 B1 | 9/2004 | Lim et al. | |
| 7,010,605 B1 | 3/2006 | Dharmarajan | |
| 7,028,179 B2 * | 4/2006 | Anderson et al. | 713/154 |
| 7,054,960 B1 | 5/2006 | Bezbaruah et al. | |
| 7,080,221 B1 | 7/2006 | Todd et al. | |

(Continued)

OTHER PUBLICATIONS

Jose Carlos Brustoloni, Protecting Electronic Commerce From Distributed Denial-of-Service Attacks, May 7-11, 2002, ACM, 1-58113-449.*

(Continued)

*Primary Examiner* — Jeffrey Pwu
*Assistant Examiner* — Samuel Ambaye
(74) *Attorney, Agent, or Firm* — Byrne Poh LLP (57) ABSTRACT

Methods, media and systems for responding to a Denial of Service (DoS) attack are provided. In some embodiments, a method includes detecting a DoS attack, migrating one or more processes that provide a service to an unaffected system; authenticating users that are authorized to use the service; and routing traffic generated by authenticated users to the unaffected system.

13 Claims, 6 Drawing Sheets

(56) References Cited

U.S. PATENT DOCUMENTS

| | | | |
|---|---|---|---|
| 7,188,366 B2* | 3/2007 | Chen et al. ............... | 726/23 |
| 7,203,944 B1 | 4/2007 | van Rietschote et al. | |
| 7,251,812 B1 | 7/2007 | Jhanwar et al. | |
| 7,257,811 B2 | 8/2007 | Hunt et al. | |
| 7,277,947 B1 | 10/2007 | Van De Sluis et al. | |
| 7,389,539 B1* | 6/2008 | Kouznetsov ............... | 726/22 |
| 7,512,769 B1 | 3/2009 | Lowell et al. | |
| 7,730,486 B2 | 6/2010 | Herington | |
| 2002/0107973 A1 | 8/2002 | Lennon et al. | |
| 2002/0120853 A1* | 8/2002 | Tyree ............... | 713/188 |
| 2003/0074487 A1 | 4/2003 | Akgul et al. | |
| 2003/0088680 A1 | 5/2003 | Nachenberg et al. | |
| 2003/0154289 A1 | 8/2003 | Williamson et al. | |
| 2003/0187915 A1 | 10/2003 | Sun et al. | |
| 2003/0195963 A1 | 10/2003 | Song et al. | |
| 2004/0055004 A1 | 3/2004 | Sun et al. | |
| 2004/0068567 A1 | 4/2004 | Moran et al. | |
| 2004/0103172 A1 | 5/2004 | Chen et al. | |
| 2004/0148520 A1* | 7/2004 | Talpade et al. ............ | 713/201 |
| 2004/0172626 A1 | 9/2004 | Jalan et al. | |
| 2005/0066019 A1 | 3/2005 | Egan et al. | |
| 2005/0144181 A1 | 6/2005 | Kii et al. | |
| 2005/0251802 A1 | 11/2005 | Bozek et al. | |
| 2005/0262411 A1 | 11/2005 | Vertest et al. | |
| 2005/0278544 A1 | 12/2005 | Baxter | |
| 2006/0089990 A1 | 4/2006 | Ng et al. | |
| 2006/0173980 A1 | 8/2006 | Kobayashi et al. | |
| 2007/0233880 A1 | 10/2007 | Nieh et al. | |

OTHER PUBLICATIONS

Sherif et al.. Proactive Server Roaming for Mitigating Denial-of-Service Attacks, 2003, IEEE, 500-504.*

Osman et al., The Design and Implementation of ZAP: A System for Migrating Computing Environments, Dec. 9-11, 2002, USENIX, pp. 361-376.*

Potter et al., Secure Isolation and Migration of Untrusted Legacy Applications, Jan. 2004, Computer Science Department Columbia University, pp. 1-15.*

Osman et al., The Design and implementation of ZAP: A System for Migrating Computing Environments. Dec. 9-11, 2002, USENIX Association, pp. 361-376.*

Potter et al., Secure Isolation and Migration of Untrusted Legacy Applications, Jan. 2004, Columbia University, pp. 1-16.*

"How to Break Out of a Chroot Jail," http://www.bpfn.net/simes/computing/chroot-break.html.

100×100 Project http://100x100network.org/.

A. Agbaria et al., "Starfish: Fault-tolerant Dynamic Programs on Clusters of Workstations," In Proceedings of the 8th IEEE International Symposium on High Performance Distributed Computing, 1999.

A. Barak and R. Wheeler, "MOSIX: An Integrated UNIX for Multiprocessor Workstations," ICSI Technical Report TR-88-004, International Computer Science Institute, University of California at Berkeley, Oct. 1988.

A. Beguelin et al., "Application Level Fault Tolerance in Heterogeneous Networks of Workstations," Journal of Parallel and Distributed Computing, 43(2):147-155, Jun. 1997.

A.C. Snoeren and H. Balakrishnan, "An End-to-End Approach to Host Mobility," Proceedings of the 6th ACM/IEEE International Conference on Mobile Computing and Networking (MobiCom '00). Boston, MA, Aug. 2000.

A. Grimshaw and W. Wulf, "The Legion Vision of a Worldwide Virtual Computer," Communications of the ACM, 40(1):39-45, Jan. 1997.

A. Tucker and D. Comay, "Solaris Zones: Operating system support for server consolidation," Sun Microsystems, Inc., May 2004.

A.D. Joseph, J.A. Tauber, and M.F. Kaashoek, "Mobile Computing with the Rover Toolkit," IEEE Transactions on Computers, 46(3)337-352, Mar. 1997.

Acharya, A., and Raje, M., "MAPbox: Using Parameterized Behavior Classes to Confine Applications," Proceedings of the 2000 USENIX Security Symposium, Aug. 2000.

Andersen, D. G., "Mayday: Distributed Filtering for Internet Services," 4th USENIX Symposium on Internet Technologies and System USITS, Mar. 2003.

Anderson, T. et al., "Preventing Internet Denial-of-Service with Capabilities," Proceedings of the 2nd Workshop on Hot Topics Networks (HotNets-II), Nov. 2003.

Appleby, K., et al., "Oceano: SLA Based Management of a Computing Utility," Proceedings of IFIP/IEEE International Symposium on Integrated Network Management, May 2001.

Archer, M., et al., "Towards a Methodology and Tool for the Analysis of Security-Enhanced Linux," Technical Report NRL/MR/5540-02-8629, NRL, 2002.

Baizer, R., and Goldman, N., "Mediating Connectors: A Non-Bypassable Process Wrapping Technology," Proceedings of the 19th IEEE International Conference on Distributed Computing Systems, Jun. 1999.

Barak, A. and Wheeler, R. "MOSIX: An Integrated Multiprocessor UNIX," Proceedings of the USENIX Winter 1989 Technical Conference, pp. 101-112, San Diego, CA, Feb. 1989.

Bartaloo, A. et al., "Transparent Run-Time Defense Against Stack Smashing Attacks," Proceedings of the 2000 USENIX Annual Technology Conference, Jun. 2000.

Barham, P. et al., "Xen and the Art of Virtualization," Proceedings of the 19th ACM Symposium on Operating Systems Principles, Bolton Landing, NY, Oct. 2003.

Baumann, A., J. Appavoo, D. Silva, J. Kerr, O. Kriger, and R.W. Wisniewski, "Providing Dynamic Update in an Operating System," Proceedings of the 2005 USENIX Annual Technical Conference, Apr. 10-15, 2005, Anaheim, CA, pp. 279-291.

Bell, D. E., and LaPadula, L. J., "Secure Computer Systems: Mathematical Foundations and Model," Technical Report ESD-TR-74-244, Mitre Corp, Bedford, MA, May 1973.

Berman, A., et al., "TRON: Process-Specific File Protection for the UNIX Operating System," Proceedings of 1995 USENIX Winter Technical Conference, pp. 165-175, New Orleans, LA, Jan. 1995.

Bhagwat, P. and Perkins, C., "A Mobile Networking System Based on Internet Protocol (IP)," Proceedings of USENIX Symposium on Mobile and Location Independent Computing, pp. 69-82, Cambridge, MA, Aug. 1993.

Biba, K., "Integrity Considerations for Secure Computer Systems." Technical Report ESD-TR-76-372, Mitre Corp, Bedford, MA, 1977.

Boyd, T., and Dasgupta, P.. "Process Migration: A Generalized Approach Using Virtualized Operating System." Proceedings of the 22nd International Conference on Distributed Computing Systems (ICDCS 2002). Vienna, Austria, Jul. 2002.

Braden, R. et al., "Resource ReSerVation Protocol (RSVP)—Version 1 Functional Specification," Internet RFC 2208, 1997.

C. Landau, "The Checkpoint Mechanism in KeyKOS," In Proceedings of the 2nd International Workshop on Object Orientation in Operating Systems, pp. 86-91, Sep. 1992.

C. Wright et al., "Versatility and Unix Semantics in a Fan-Out Unification File System," Technical Report, Stony Brook University, FSL-04-01b, Jan. 2004.

C.E. Perkins and D.B. Johnson, "Mobility Support in IPv6,"MOBICOM 96, pp. 27-37, Rye NY, 1996.

C.P. Sapuntzakis, R. Chandra, B. Pfaff, J. Chow, M.S. Lam, and M. Rosenblum, Optimizing the Migration of Virtual Computers, Proceedings of the 5th Operating Systems Design and Implementation, Boston, MA, Dec. 2002.

Collins, M. et al., "An Empirical Analysis of Target-Resident DoS Filters," Proceedings of the IEEE Symposium on Security and Privacy, May 2004.

Cook, D. L. et al., "WebSOS: Protecting Web Servers From DDoS Attacks,"Proceedings of the 11th IEEE Conference on Networks (ICON), Sep. 2003, pp. 455-460.

Cowan, C. et al. "Stackguard: Automatic Adaptive Detection and Prevention of Buffer-Overflow Attacks," Proceedings of the 7th USENIX Security Symposium, pp. 63-78, San Antonio, TX, Jan. 1998.

Cowan, C. et al. "SubDomain: Parismonious Security for Server Appliances," Proceedings of the 14th USENIX System Administration Conference (LISA 2000) New Orleans, LA, 2000.

D. Baily, et al., "The NAS Parallel Benchmarks," The International Journal of Supercomputer Applications, 5(3):63-72, Fall 1991.

D. Cheriton, "The V Distributed System," Communications of the ACM, 31(3):314-333, Mar. 1988.

D. Mosberger et al.. "httperf—A Tool for Measuring Web Server Performance," HP Research Labs, 1998.

D.A. Maltz and P. Bhagwat, "MSOCKS: An Architecture for Transport Layer Mobility," Proceedings of the IEEE INFOCOM '98. pp. 1037-1045, San Fransico, CA. 1998.

Dasgupta, P., and Boyd. T.. "Virtualizing Operating System for Seamless Distributed Environments," IASTED Intl. Conference on Parallel and Distributed Computing and Systems, vol. 2, pp. 735-740, Nov. 2000.

Dean, D. et al., "An Algebraic Approach to IP Traceback," Proceedings of the Symposium on Network and Distributed System Security (SNDSS), Feb. 2001, pp. 3-12.

Dean, D. et al., "Using Client Puzzles to Protect TLS," Proceedings of the 10th USENIX Security Symposium, Aug. 2001.

Delegate. http://www.delegate.org/.

Department of Defense, "Trusted Computer System Evaluation Criteria Orange Book)," Technical Report DoD 5200.28-STD, Department of Defense, Dec. 1985.

Dierks, T. et al., "The TLS Protocol Version 1.0," RFC 2246, Jan. 1999.

Dingledine, R. et al., "Tor: The Second-Generation Onion Router," Proceedings of the 13th USENIX Security Symposium, Aug. 2004, pp. 303-319.

E. Roman, "A Survey of Checkpoint/Restart Implementations," Technical Report, Lawrence Berkeley National Laboratory. 2002.

F. Douglis and J. Ousterhout. "Transparent Process Migration: Design Alternatives and the Sprite Implementation," Software—Practice and Experience, 21(8):757-785, Aug. 1991.

Foster, I., and Kesselman, C., "Globus: A Metacomputing Infrastructure Toolkit," Proceedings of the Workshop on Environments and Tools for Parallel Scientific Computing, Lyon, France, Aug. 1996.

Foster, I., et al., "The Physiology of the Grid: An Open Grid Services Architecture for Distributed Systems Integration," Open Grid Service Infrastructure WG, Global Grid Forum, Jun. 2002.

Fraser, T. et al., "Hardening COTS Software with Generic Software Wrappers," Proceedings of the IEEE Symposium on Security and Privacy, Oakland, CA, May 1999.

FreeBSD Project, Developer's Handbook, http://www.freebsd.org/doc/en_YS.ISO8859-1/books.developers-handbook/secure-chroot.html.

G. Bronevetsky et al., "C3: A System for Automating Application-Level Checkpointing of MPI Programs," In Proceedings of the 16th International Workshop on Languages and Compilers for Parallel Computers (LCPC '03), Oct. 2003.

G. Fagg et al., "FT-MPI: Fault Tolerant MPI, Supporting Dynamic Applications in a Dynamic World," In LNCS: Proceedings of the 7th European PVM/MPI Users' Group Meeting, vol. 1908, pp. 346-358, 2000.

G. Su and J. Nieh, "Mobile Communication with Virtual Network Address Translation," Technical Report CUCS-003-02, Department of Computer Science, Columbia University, Feb. 2002.

G. Su, "MOVE: Mobility with Persistant Network Connections," Department of Computer Science, Columbia University, Oct. 2004.

Gannon, D. et al., "Programming the Grid: Distributed Software Components, P2P and Grid Web Services for Scientific Applications," Cluster Computing, 5(3), 2002.

Garfinkel, T. "Traps and Pitfalls: Practical Problems System Call Interposistion Based Security Based Security Tools," Proc. Network and Distributed Systems Security Symposium, Feb. 2003.

Garfinkel, T. et al. "A Virtual Machine Introspection Based Architecture for Intrusion Detection," Proceedings of the 10th Network and Distributed System Security Symposium (NDSS). 191-206, Feb. 2003.

Garfinkel, T. et al., "Ostia: A Delegating Architecture for Secure System Call Interposition,"Proceedings of the 11th Network and Distributed System Security Symposium (NDSS), 187-201, Feb. 2004.

Garfinkel, T., et al., "Terra: A Virtual Machine-Based Platform for Trusted Computing," Proceedings of the 19th Symposium on Operating System Principles (SOSP 2003), Oct. 2003.

Ghormley, D. P., et al., "Silic: An Extensibility System for Commodity Operating Systems," Proceedings of the 1998 USENIX Annual Technical Conference, pp. 39-52, Jun. 1998.

Gligor, V. D. "Guaranteeing Access Spite of Distributed Service-Flooding Attacks," Proceedings of the Security Protocols Workshop, Apr. 2003.

Global Crossing's IP Network Performance. http://www.globalcrossing.com/xml/network/net_ip_performance.xml.

Gobbles Security. "Local/Remote mpg223 Exploit," http://www.opennet.ru/base/exploits/1042565884_668.txt.html.

Goldberg, I., et al., "A Secure Environment for Untrusted Helper Applications," Proceedings of the 1990 USENIX Annual Technical Conference, 1996.

Goodrich, M. T., "Efficient Packet Marking for Large Scale IP Traceback," Proceedings at the 9th ACM Conference on Computer and Communications Security (CSS), Nov. 2002, pp. 117-126.

GreyMagic Security Research. "Reading Local Files Netscape 6 and Mozilla," http://sec.greymagic.com/adv/gm001-ns/.

H. Zong and J. Nieh, "CRAK: Linux Checkpoint/Restart as a Kernel Module," Technical Report CUCS-014-01, Department of Computer Science, Columbia University, Nov. 2001.

Hain, T., "Architectural Implications of NAT," RFC2993, IETF, Nov. 2000.

Handley, M., et al., "TCP Congestion Window Validation," RFC 2861, ACIRI, Jun. 2000.

Heberlein, L. et al. "Attack Class: Address Spoofing," Proceedings of the 19th National Information Systems Security Conference, Oct. 1996, pp. 371-377.

Holdrede, M., and Srisuresh, P., "Protocol Complications with the IP Network Address Translator," RFC3027, IETF, Jan. 2001.

http://developer.osdl.org/craiger/hackbench.

httperf, http://www.hpl.hp.com/personal/David_Mosberger/httperf.html.

Hussain, A. et al., "A Framework for Classifying Denial of Service Attacks," Proceedings of ACM SIGCOMM, Aug. 2003, pp. 99-110.

Internet Suspend/Resume Project, http://pittsburgh.intel-research.net/projects/completed/isr.html.

Ioannidis, J. et al.. "Implementing Push-Back: Router-Based Defense Against DDoS Attacks," Proceedings of the ISOC Symposium on Network and Distributed System Security (SNDSS), Feb. 2002.

Ioannidis, J. et al., "IP-Based Protocols for Mobile Internetworking," Proceedings of ACM SIGCOMM, pp. 235-245, 1991.

Ioannidis, S., and Bellovin, S., "Sub-Operating Systems: A New Approach to Application Security." Technical Report MS-CIS-01-06, Univ. of Pennsylvania, Feb. 2000.

J. Casas, D.L. Clark, R. Conru, S.W. Otto, R.M Prouty, and J. Walpole, MPVM: A Migration Transparent Version of PVM, Computing Systems, 8(2):171-216, 1995.

J. Duell et al., The Design and Implementation of Berkeley Lab's Linux Checkpoint/Restart, Technical Report, Lawrence Berkeley National Laboratory. 2002.

J. Janakiraman et al., "Cruz: Application-Transparent Distributed Checkpoint-Restart on Standard Operating Systems," In Proceedings of the International Conference on Dependable Systems and Networks (DSN '05), Jun. 2005.

J. Jung, E. Sit, H. Balakrishnan, and R. Morris, "DNS Performance and the Effectiveness of Caching," Proceedings of ACM, SIGCOMM Internet Measurement Workshop, pp. 153-167, San Francisco, CA, Nov. 2001.

J. Plank, "An Overview of Checkpointing in Uniprocessor and Distributed Systems, Focusing on Implementation and Performance," Technical Report UT-CS-97-372. Department of Computer Science, University of Tennessee, Jul. 1997.

J. Sancho et al., "Current Practice and Direction Forward in Checkpoint/Restart Implementations for Fault Tolerance," In Proceedings of the 19th IEEE International Parallel and Distributed Processing Symposium (IPDPS '05), Apr. 2005.

J.S. Plank, M. Beck, G. Kingsley, and K. Li, "Libckpt: Transparent Checkpointing Under Unix," Proceedings of USENIX Winter 1995 Technical Conference, pp. 213-223, New Orleans, LA, Jan. 1995.

Jain, K., and Sekal, R., "User-Level Infrastructure for System Call Interposition: A Platform for Intrusion Detection and Confinement," Network and Distributed System Security Symposium, pp. 19-34, San Diego, California, Feb. 2000.

Jin, C. et al., "Hop-Count Filtering: An Effective Defense Against Spoofed DoS Traffic," Proceedings of the 10th ACM International Conference on Computer and Communications Security (CCS), Oct. 2003, pp. 30-41.

Johnson, D. B. and Perkins, C.. "Mobility Support IPv6." draft-ietf-mobileip-ipv6-16.txt, IETF, Mar. 2002.

Jones, M., "Interposistion Agents: Transparently Interposing User Code at the System Interface," 14th ACM Symposium on Operating Systems Principles, Dec. 1993.

Jul, E., "Migrations of Light-Weight Processes Emerald,"IEEE Technical Commitee on Operating Systems Newsletter, 3(1):20-23, 1989.

K. Amiri, D. Petrou, G. Ganger, and C. Gibson, "Dynamic Function Placement in Active Storage Clusters," Technical Report CMU-CS-99-140, School of Computer Science, Carnegie Megan University, Jun. 1999.

K. Chandy at al., "Distributed Snapshots: Determining Global States of Distributed Systems," ACM Transactions on Computer Systems, 3(1): 63-75, Feb. 1985.

Kamp, P. H. and Watson, R. N. M., "Jails: Confining the Omnipotent Root," In 2nd International SANE Conference, MECC, Maastricht, The Netherlands, May 2000.

Karger, D. et al., "Consistent Hashing and Random Trees: Distributed Caching Protocols for Relieving Hot Spots on the World Wide Web," Proceedings of the ACM Symposium on Theory of Computing (STOC). May 1997, pp. 654-663.

Karger, P. A., and Schell, R. R., "MULTICS Security Evaluation: Vulnerability Analysis," Technical Report ESD-TR-74-193. Mitre Corp, Bedford, MA, Jun. 1974.

Kargl, F. et al., "Protecting Web Servers From Distributed Denial of Service Attacks," Proceedings of the W3C World Wide Web Conference (WWW), 2001, pp. 514-524.

Kent, S. et al., "Security Architecture for the Internet Protocol," RFC 2401, Nov. 1998.

Kephart, J. O., and Chess. D. M., "The Vision of Autonomic Computing," IEEE Computer, pp. 41-50, Jan. 2003.

Keromytis, A. D. et al., "SOS: An Architecture for Mitigating DDoS Attack," IEEE Journal on Selected Areas of Communications (JSAC), 2003, pp. 413-426, 33(3).

Keromytis, A. D. at al., "SOS: Secure Overlay Services," Proceedings of ACM SIG-COMM, Aug. 2002, pp. 61-72.

Keromytis, A. D. et al., "The Design of the OpenBSD Cryptographic Framework," Proceedings of the USENIX Annual Technical Conference, Jun. 2003, pp. 181-196.

Khattab, S. M. et al., "Roaming Honeypots for Mitigating Service-Level Denial-of-Service Attacks," Proceedings of the 24th International Conference on Distributed Computing Systems (ICDCS). Mar. 2004, pp. 238-337.

Kozuch, M., and Satyanarayanan, M.,"Internet Suspend/Resume," Fourth IEEE Workshop on Mobile Computing Systems and Applications, Calicoon, NY, Jun. 2002.

Krell, E., and Krishnamurthy, B., "COLA: Customized Overlaying," Proceedings of the USENIX Winter Conference, pp. 3-8, USENIX, Jan. 1992.

Lai, A. and Nieh, J., "Limits of Wide-Area Thin-Client Computing," Proceedings of the ACM International Conference on Measurements and Modeling of Computer Systems (SIGMETRICS 2002), pp. 228-239, Marina del Rey, CA, Jun. 2002.

Lakshminarayanan, K. et al., "Taming IP Packet Flooding Attacks," Proceedings of the 2nd Workshop on Hot Topics Networks (HotNets-II), Nov. 2003.

Landwehr, C. E., "Formal Models for Computer Security," ACM Computing Surveys, 13(3):247-278, Sep. 1981.

Legard, D., "Korea to Build 100Mbps Internet System," InfoWorld, Nov. 18, 2003. http://www.inforworld.com/article/03/11/18/HNkorea_1.html.

Li, J. et al., "Large-Scale IP Traceback High-Speed Internet: Practical Techniques and Theoretical Foundation," Proceedings of IEEE Symposium on Security and Privacy, May 2004.

Linux VServer Project, http://www.linux-vserver.org/.

Litzkow, M. et al., "Checkpoint and Migration of UNIX Processes the Condor Distributed Processing System." Technical Report 1346. University of Wisconsin-Madison Computer Sciences, Apr. 1997.

Loscocco, P., and Smalley, S., "Integrating Flexible Support for Security Policies into the Linux Operating System," Proceedings of the FREENIX Track: 2001 USENIX Annual Technical Conference, 29-40, Jun. 2001.

Lowell, D., Saito, Y., Samberg, E., "Devirtualizable Virtual Machines Enabling General, Single-Node, Online Maintenance," ASLOS '04 (Oct. 9-13, 2004), pp. 211-223 [retrieved from http://portal.acm.org/citation/cfm?id=1024419 on Aug. 17, 2010].

M. Radhunath, C. Narayanaswani, C. Caster, and R. Caceres, "Reincarnating PCs with Portable SoulPads," Technical Report RC23418 (W0411-057), IBM Research Division, Thomas J. Watson Research Center, Nov. 8, 2004.

McVoy, L. W., and Staelin, C., "1mbench: Portable Tools for Performance Analysis," USENIX Annual Technical Conference, pp. 279-294, 1996.

Miltchev, S. et al., "A Study of the Relative Costs of Network Security Protocols." Proceedings of the USENIX Annual Technical Conference, Freenix Track, Jun. 2002, pp. 41-48.

Moore, D. et al., "Inferring Internet Denial-of-Service Activity," Proceedings of the 10th USENIX Security Symposium, Aug. 2001, pp. 9-22.

Moreinm W. G. et al., "Using Graphic Turing Tests to Counter Automated DDoS Attacks Against Web Servers," Proceedings of the 10th ACM International Conference on Computer and Communications Security (CCS), Oct. 2003, pp. 8-19.

Mori, G. et al., "Recognizing Objects Adversarial Clutter: Breaking a Visual CAPTCHA," Computer Vision and Pattern Recognition CVPR.

Muthitacharoen, A. et al., "A Low Bandwidth Network File System." Proceedings of the 18th ACM Symposium on Operating Systems Principles, Oct. 2001, pp. 174-187, Chateau Lake Louise, Banff, Canada.

Narayanaswamy, S. et al., "Application and Network Support for InfoPad," IEEE Personal Communications, Mar. 1996.

Netperf. http://www.netperf.org/.

NFS; Network File System Protocol Specification, RFS1094, Sun Microsystems, Inc. Mar. 1989.

Nieh: J. et al. "Measuring Thin-Client Performance using Slow-Motion benchmarking," ACM Transactions on computer systems (TOCS), 21(1):87-115: Feb. 2003.

Office Action dated Jan. 19, 2011 in U.S. Appl. No. 11/564,313.
Office Action dated Jan. 27, 2012 in U.S. Appl. No. 11/584,451.
Office Action dated Feb. 16, 2010 in U.S. Appl. No. 11/584,314.
Office Action dated Mar. 1, 2010 in U.S. Appl. No. 11/584,313.
Office Action dated Apr. 25, 2011 in U.S. Appl. No. 11/584,314.
Office Acton dated May 9, 2011 in U.S. Appl. No. 11/584,451.
Office Action dated May 29, 2009, in U.S. Appl. No. 11/584,313.
Office Action dated Jun. 1, 2009 in U.S. Appl. No. 11/584,314.
Office Action dated Jul. 30, 2010 in U.S. Appl. No. 11/584,313.
Office Action dated Aug. 2, 2010 in U.S. Appl. No. 11/584,313.
Office Action dated Aug. 3, 2010 in U.S. Appl. No. 11/584,313.
Office Action dated Aug. 17, 2010 in U.S. Appl. No. 11/584,314.
Office Action dated Aug. 23, 2010 in U.S. Appl. No. 11/584,451.
Office Action dated Dec. 10, 2009 in U.S. Appl. No. 11/584,451.

Osman, S, D. Subhraveti, Gong Su. and J. Nieh, "The Design and Implementation of Zap: A System for Migrating Computing Environments," Proceedings of the 5th Symposium on Operating Systems Design and Implementation (OSDI 2002), Boston, MA, Dec. 2002, pp. 361-376.

P. Bhagwat, C. Perkins, and S. Tripathi, "Network Layer Mobility: An Architecture and Survey," IEEE Personal Communications, 3(3)54-64, Jun. 1996.

Papadopoulous, C. et al., "COSSACK: Coordinated Supression of Simultaneous Attacks," Proceedings of DISCEX III, Apr. 2003, pp. 2-13.

Park, K. et al., "On the Effectiveness of Route-Based Packet Filtering for Distributed DoS Attack Prevention Power-Law Internets," Proceedings of ACM SIG-COMM, Aug. 2001, pp. 15-26.

Perkins, C., "IP Mobility Support for IPv4, Revised," draft-ietf-mobileip-rfc2002-bis-08.txt, Internet Draft, Sep. 2001.

Peterson, L. et al., "A Blueprint for Introducing Disruptive technology into the Internet," Proceedings of the 1st Workshop on Hot Topics Networks (HotNets-I), Oct. 2002.

Pike, R. et al., "Plan 9 from Bell Labs," Technical White Paper, Bell Laboratories, Murray Hill, New Jersey, 1995.

Popek, G. J., and Goldberg. R. P., "Formal Requirements for Virtualizable Third Generation Architectures," Commun. ACM, 17(7):412-421, 1974.

Poskanzer, J., http://www.acme.com/software/http...load/.

Potter, S., J. Nieh, D. Subhraveti, "Secure Isolation and Migration of Untrusted Legacy Applications." Columbia University Technical Report CUCS-005-04 (Jan. 2004). pp. 1-6. [Retrieved from http://www.nci.cs.columbia.edu/publications/cucs-005-04.pdf on Dec. 2, 2009].

Price, D. and Tucker, A., "Solaris Zones: Operating System Support for Consolidating Commerical Workloads," 18th Large Installation System Administration Conference (LISA 2004), Nov. 2004.

Provos, N., "Improving Host Security with System Call Policies," 12th USENIX Security Symposium, Washington, DC, Aug. 2003.

Provos, N., et al., "Preventing Privilege Escalation," 12th USENIX Security Symposium, Washington, DC, Aug. 2003.

Pruyne, J. and Livny, M., "Managing Checkpoints for Parallel Programs," 2nd Workshop on Job Scheduling Strategies for Parallel Processing (In Conjunction with IPPS '96), Honolulu, Hawaii, Apr. 1996.

R. Baratto, J. Nieh, and L. Kim, "THINC: A Remote Display Architecture for Thin-Client Computing," Technical Report CUCS-027-04, Department of Computer Science, Columbia University, Jul. 2004.

R. Baratto, S. Potter, G.Su, and J. Nieh, "MobiDesk: Mobile Virtual Desktop Computing." In Proceedings of the Tenth Annual ACM International Conference on Mobile Computing and Networking (MobiCom 2004), Philadelphia, PA, Sep. 2004.

Rashid, R. and Robertson, G., "Accent: A Communication Oriented Network Operating System Kernel," Proceedings of the 8th Symposium on Operating Principles, pp. 64-75, Dec. 1984.

Reed, M. et al., "Anonymous Connections and Onion Routing," IEEE Journal on Selected Areas Communications (JSAC), May 1998, pp. 482-494, 16(4).

Reiher, P. et al., "Attacking DDoS at the Source," Proceedings of the 10th IEEE International Conference on Network Protocols, Nov. 2002.

Rescorla, E., "Security Holes . . . Who Cares?" Proceedings of the 12th USENIX Security Conference, Washington, D.C., Aug. 2003.

Richardson, T. et al., "Virtual Network Computing," Proceedings of IEEE Internet Computing vol. 2, Jan./Feb. 1998.

Rozier, M., et al., "Overview of the Chorus Distributed Operating System," Workshop on Mirco-Kernels and Other Kernel Architectures, pp. 39-70, Seattle, WA, 1992.

Russell, R., "Linux 2.4 Packet Filtering HOWTO," Linux Netfiller Core Team, Nov. 2001. http://netfilter.samba.org/.

S. Balay et al., "PETSc 20. User's Manual," Technical Report ANL-95/11—Revision 2.0.29, 2000.

S. J. Mullender, G. Van Rossum, A. S. Tanenbaum, R. Van Renessem and H. Van Staveren, "Amoeba—A Distributed Operating System for the 1900s," IEEE Computer, 23(5):44-53, May 1990.

S. Sankaran et al., "LAM/MPI Checkpoint/Restart Framework: System-Initiated Checkpointing," In Proceedings of the LACSI Symposium, Oct. 2003.

S. Stolis et al., "The Global File System," In Proceedings fo the Fifth NASA Goddard Conference on Mass Storage Systems, pp. 1-23, 1996.

Saitzer, J. H. et al., "End-to-End Arguments System Design," ACM Transactions on Computer Systems, Nov. 1984, pp. 277-288, 2(4).

Saitzer, J. H., and Schroeder, M. D., "The Protection of Information Computer Systems," Proceedings of the IEEE, vol. 63, No. 9, pp. 1278-1308, Sep. 1975.

Satyanarayanan, M. et al., "Coda: A Highly Avaliable File System for Distributed Workstation Environments," IEEE Transactions on Computers, Apr. 1990, 39(4).

Savage, S. et al., "Network Support for IP Traceback," ACM/IEEE Transactions on Networking, Jun. 2001, pp. 226-237, 9(3).

Savage, S. et al., "Practical Network Support IP Traceback," Proceedings of ACM SIGCOMM, Aug. 2000, pp. 295-306.

Savage, S. et al., "TCP Congestion Control with a Misbehaving Receiver," ACM Computer Communications Review, Oct. 1999, pp. 71-78, 29(5).

Schmidt, B. K., "Supporting Ubiquitous Computing with Stateless Consoles and Compulation Caches," PhD. Thesis, Computer Science Department, Stanford University, 2000.

Schmidt, B. K., et al., "The Interactive Performance of SLIM: A Stateless, Thin-Client Architecture," 17th ACM Symposium on Operating Systems Principles (SOSP), vol. 34, pp. 32-47, Kiawah island Resort, SC, Dec. 1999.

Schneier, B., "Applied Cryptography," John Wiley and Sons, second edition, 1996.

Schuba, C. et al., "Analysis of a Denial of Service Attack on TCP," Proceedings of the IEEE Symposium on Security and Privacy. May 1997, pp. 208-223.

Senie, D., "Networking Address Translator (NAT)-Friendly Application design Guidelines," RFC3235, IETF, Jan. 2002.

SHFS Development Team, SHell File System, SHFS, http://shfs.sourceforge.net.

Smith, P. and Hutchinson, N. C., "Heterogenous Process Migration: The Tui System," Software—Practice and Experience, vol. 28, No. 6, pp. 611-639, 1998.

Snoeren, A. et al., "Hash-Based IP Tracebook," Proceedings of ACM SIGCOMM, Aug. 2001.

Softricity, Inc. http://www.softricity.com.

Spencer, R., et al., "The Flask Security Architecture: System Support for Diverse Security Policies," Proc. of the Eighth USENIX Security Symposium, Aug. 1999.

Stavrou. A. et al., "A Lightweight, Robust P2P system to Handle Flash Crowds," IEEE Journal on Selected Areas Communications (JSAC), Jan. 2004, pp. 6-17, 22(1).

Stavrou, A. et al., "A Pay-Per-Use DoS Protection Mechanism for the Web," Proceedings of the Applied Cryptography and Network Secunty (ACNS) Conference, Jun. 2004, pp. 120-134.

Stoica, I. et al., "Chord: A Scalable Peer-to-Peer Lookup Service for Internet Application," Proceedings of ACM SIGCOMM, Aug. 2001.

Stone, R. et al., "CenterTrack: An IP Overlay Network for Tracking DoS Floods," Proceedings of the USENIX Security Symposium. Aug. 2000.

Sultan, F., et al., "Migratory TCP: Highly Available Internet Services Using Connection Migration." Proceedings of ICDCS, pp. 17-26, 2002.

Swift, M. et al., "Improving the Reliability of Commodity Operating systems," SOSP '03: Proceedings of the Nineteenth ACM Symposium on Operating Systems Principles, pp. 207-222, ACM Press. New York, NY, 2003.

T. Takahashi et al, "PM2: High Performance Communication Middleware for Heterogeneous Network Environments," in Proceedings of the IEEE/ACM SC2000 Conference, Nov. 2000.

Tennehouse, D. L. et al., "A Survey of Active Network Research," IEEE Communications Magazine, Jan. 1997, pp. 80-86.

Teraoka, F. et al., "A Network Architecture Providing Host Migration Transparency," Proceedings of ACM SIGCOMM, Sep. 1991.

The Volano Report, Volano LLC, Dec. 2001. http://www.volano.com/report.

The XFREE86 Project. http://www.xfree86.org.

Thomas, R. et al., "Net-Bouncer: Client-Legitimacy-Based High-Performance DDoS Filtering," Proceedings of DISCEX III, Apr. 2003, pp. 14-25.

TPC-W Java Implementation. http://mitglied.lycos.de/jankiefer/tpcw/.

Trusted Computing Platform Alliance. TCPA Main Specfification v1.1b. http://www.trustedcomputing.org.

U.S. Appl. No. 11/584,451, filed Oct. 20, 2006.

U.S. Appl. No. 11/584,313, filed Oct. 20, 2006.

U.S. Appl. No. 60/729,093, filed Oct. 20, 2005.

U.S. Appl. No. 11/584,314, filed Oct. 20, 2006.
U.S. Appl. No. 60/729,095, filed Oct. 20, 2005.
U.S. Appl. No. 60/729,094, filed Oct. 20, 2005.
U.S. Appl. No. 60/729,096, filed Oct. 20, 2005.
U.S. Appl. No. 60/729,116, filed Oct. 21, 2005.
USENIX. Proceedings of the 3rd Virtual Machine Research and Technology Symposium, May 6-7, 2004, San Jose, CA, USA, May 2004.
Using the RDTSC Instruction for Performance Monitoring, Pentium II Processor Application Notes, Intel Corporation, 1997.
Vixie, P. et al., "Dynamic Updates the Domain Name System (DNS Update)," RFC2136, IETF, Apr. 1997.
VMware VirtualCenter. http://www.vmware.com/products/vmanage/.
VMware, Inc. http://www.vmware.com.
Von Ahn, L. et al., "CAPTCHA: Using Hard AI Problems for Security," Proceedings of EUROCRYPT, 2003.
W. Gropp, "MPICH2: A New Start for MPI Implementations," In LNCS: Proceedings of the 9th European PVM/MPI Users' Group Meeting on Recent Advances in Parallel Virtual Machine and Message Passing Interface, vol. 2474, p. 7, 2002.
Wagner, D., "Janus: An Approach for Confinement of Untrusted Applications," Master's Thesis, University of California, Berkeley, 1999.
Wang, X. et al., "Defending Against Denial-of-Service Attacks with Puzzle Auctions (Extended Abstract)," Proceedings of the IEEE Symposium on Security and Privacy, May 2003.
Whitaker, A., et al., "Scale and Performance the Denali Isolation Kernel," Proceedings of the Fifth Symposium on Operating Systems Design and Implementation (OSDI 2002), Boston, MA, Dec. 2002.
X. Qu, J.X. Yu, and R.P. Brent, "A Mobile TCP Socket," International Conference on Software Engineering (SE '97), San Francisco, CA Nov. 1997.
Xuan, D. et al., "Analyzing the Secure Overlay Service Architecture Under Intelligent DDoS Attacks," Proceedings of the 24th International Conference on Distributed Computing Systems (ICDCS), Mar. 2004, pp. 408-417.
Y. Artsy, Y. Chang. and R. Finkel, "Interprocess Communication in Charlotte," Computer Sciences Technical Report #632, Computer Sciences Department, University of Wisconsin-Madison, Feb. 1986.
Y. Chen et al., "CLIP—A Checkpointing Tool for Message-Passing Parallel Programs," in Proceedings of the Supercomputing, Nov. 1997.
Y. Huang et al., "Software Tools and Libraries for Fault Tolerance," IEEE Technical Committee on Operating Systems and Application Environments, 7(4)5-9, 1995.
Y. Zhang and S. Dao, "A Persistent Connection' Mode for Mobile and Distributed Systems," 4th International Conference on Computer Communications and Networks (IC-CCN), Las Vegas, NV, Sep. 1995.
Yaar, A. et al., "Pi: A Path Identification Mechanism to Defend Against DDoS Attacks," Proceedings of the IEEE Symposium on Security and Privacy, May 2003.
Yaar. A. et al., "SIFF: A Stateless Internet Flow Fiiter to Mitigate DDoS Flooding Attacks," Proceedings of the IEEE Symposium on Security and Privacy, May 2004.
Yalagandula, P. et al., "Transparent Mobility with Minimal Infrastructure," Technical Report 01-30, University of Texas at Austin, Jun. 2001.
Zadok, E., and Nieh, J., "FiST: A Language for Stackable File systems," Proceedings of the Annual USENIX Technical Conference, pp. 55-70, Jun. 2000.
Zandy, V. C., and Miller, B. P., "reliable Network Connections," Proceedings of 8th ACM International Conference on Mobile Computing and Networking (MobiCom '02): Atlanta, GA, Sep. 2002.
Anonymous, "Technical Analysis of 007: Agent Under Fire Save Game Hack", Jul. 9, 2003, available at: http://www.xbox-linux.org/docs/007analysis.html.
Blackert, W.J., et al., "Analyzing Interaction Between Distributed Denial of Service Attacks and Mitigation Technologies", In Proceedings of the DARPA Information Survivability Conference and Exposition (DISCEX III), vol. 1, Apr. 22-24, 2003, pp. 26-36.
CCITT, "X.509: The Directory Authentication Framework", International Telecommunications Union, Nov. 1988.
Goldberg, R.P., "Architectural Principles for Virtual Computer Systems", Harvard University, Feb. 1973, pp. 1-249.
Kozuch, M., et al., "Enterprise Client Management with Internet Suspend/Resume", In Intel Technology Journal, vol. 8, No. 4, Nov. 17, 2004, pp. 313-324.
Kozuch, M., et al., "Seamless Mobile Computing on Fixed Infrastructure", In IEEE Computer, vol. 37, No. 7, Jul. 2004, pp. 65-72.
Notice of Allowance and Fee(s) Due mailed Mar. 19, 2012 in U.S. Appl. No. 11/584,313, filed Oct. 20, 2006.
Office Action dated Aug. 1, 2012 in U.S. Appl. No. 11/584,451.
Satyanarayanan, M., et al., "Towards Seamless Mobility on Pervasive Hardware", In Pervasive & Mobile Computing, vol. 1, No. 2, May 31, 2005, pp. 157-189.
Smith, J.E., and Nari, R., "Virtual Machines: Versatile Platforms for Systems and Processes", Morgan Kaufmann Publishers, Jun. 3, 2005, pp. 1-638.
Tannenbaum, T., and Litzkow, M., "The Condor Distributed Processing System", Dr. Dobb's Journal-Software Tools for the Professional Programmer, vol. 20, No. 2, Feb. 1, 1995, pp. 40-49.
Office Action dated Feb. 14, 2013 in U.S. Appl. No. 11/584,314.

* cited by examiner

METHODS, MEDIA AND SYSTEMS FOR RESPONDING TO A DENIAL OF SERVICE ATTACK

CROSS-REFERENCE TO RELATED APPLICATIONS

This application claims priority under 35 U.S.C. §119(e) from U.S. Provisional Application No. 60/729,094, filed on Oct. 20, 2005, U.S. Provisional Application No. 60/729,093, filed on Oct. 20, 2005, and U.S. Provisional Application No. 60/729,116, filed on Oct. 21, 2005, which are hereby incorporated by reference in their entireties.

STATEMENT REGARDING FEDERALLY SPONSORED RESEARCH OR DEVELOPMENT

The government may have certain rights in the present invention pursuant to grants by National Science Foundation, grant numbers ANI-0117738 and ITR CNS-0426623, CAREER Award ANI-0133829, and DARPA contract No. F30602-02-2-0125 (FTN program).

TECHNOLOGY AREA

The disclosed subject matter relates to methods, media and systems for responding to a Denial of Service (DoS) attack.

BACKGROUND

As computers have become faster, cheaper, they have become ubiquitous in academic, corporate, and government organizations. At the same time, the widespread use of computers has given rise to enormous management complexity and security hazards, and the total cost of owning and maintaining them is becoming unmanageable. The fact that computers are increasingly networked complicates the management problem.

One difficult problem is to maintain services in the presence of network denial of service (DoS) attacks. DoS attackers deny use of the service to other users by exhausting computing resources. For example, an attacker can try to cause a web server to perform excessive computation, or exhaust all available bandwidth to and from the server. In link congestion attacks, the attackers identify pinch-points in the communications substrate and render them inoperable by flooding them with large volumes of traffic. Apart from being costly and annoying, DoS attacks are particularly damaging for time- or life-critical services (e.g., tracking the spread of an real-world epidemic).

Although several mechanisms to suppress or counter DoS attacks have been proposed, these mechanisms are dependent on elements of the network infrastructure. However, providing infrastructure support for this problem may violate the end-to-end (e2e) principle, one of the fundamental tenets of Internet design, which states that functionalities should be placed as close to the network edges as possible in order to keep the network core focused on the task of routing packets. Therefore, it is desirable to provide a solution to the DoS problem without requiring Internet infrastructure changes.

SUMMARY

Methods, media and systems for responding to a DoS attack are provided. In some embodiments, methods for responding to a DoS attack are provided, comprising: detecting the DoS attack; migrating one or more processes that provide a service to an unaffected system; authenticating users that are authorized to use the service; and routing traffic generated by authenticated users to the unaffected system.

In some embodiments, computer-readable media containing computer-executable instructions that, when executed by a processor, cause the processor to perform a method for responding to a DoS attack are provided, the method comprising: detecting the DoS attack; migrating one or more processes that provide a service to an unaffected system; authenticating users that are authorized to use the service; and routing traffic generated by authenticated users to the unaffected system.

In some embodiments, systems for responding to a DoS attack are provided, comprising: a migration system configured to migrate one or more processes that provide a service from a first digital processing device to a second digital processing device when the first digital processing device is affected by the DoS attack; and an overlay network configured to authenticate authorized users and route traffic from the authorized users to the second digital processing device.

BRIEF DESCRIPTION OF THE DRAWINGS

The Detailed Description, including the description of various embodiments of the invention, will be best understood when read in reference to the accompanying figures wherein.

DETAILED DESCRIPTION

Methods, media and systems for responding to a DoS attack are provided. In some embodiments, services provided by a computer system may be migrated when the computer system is affected by a DoS attack. To this end, a virtualized operating system environment can be used to migrate applications in a flexible manner.

Figure 1:
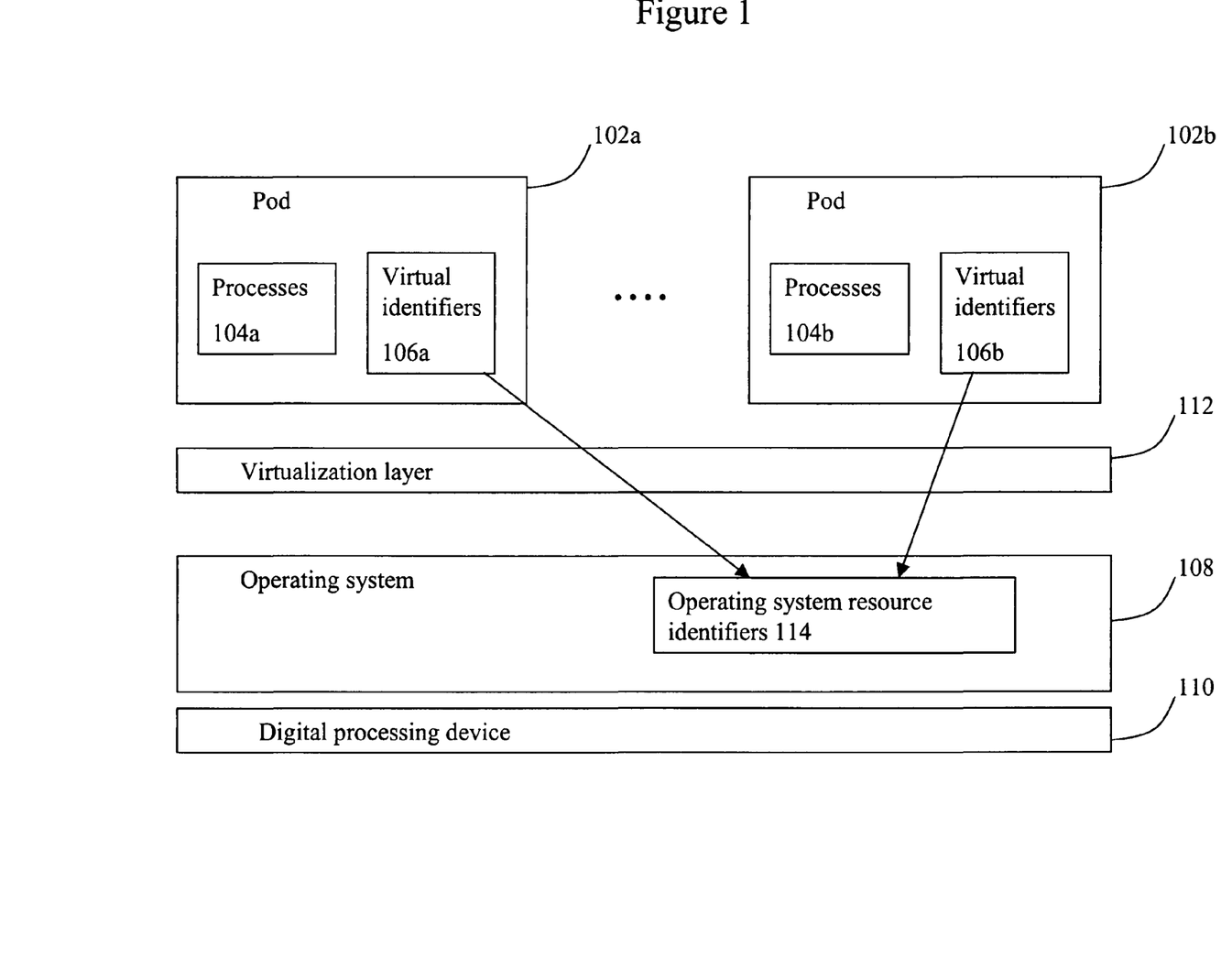
FIG. 1 is a block diagram illustrating an operating system virtualization scheme according to some embodiments.

FIG. 1 is a block diagram illustrating an operating system virtualization scheme in some embodiments. An operating system 108 that runs on digital processing device 110 can be provided with a virtualization layer 112 that provides a PrOcess Domain (pod) abstraction. Digital processing device 110 can include, for example, computers, set-top boxes, mobile computing devices such as cell phones and Personal Ditigal Assistants (PDAs), other embedded systems and/or any other suitable device. One or more pods, for example, Pod 102a and Pod 102b, can be supported. A pod (e.g., pod 102a) can include a group of processes (e.g., processes 104a) with a private namespace, which can include a group of virtual identifiers (e.g., identifiers 106a). The private namespace can present the process group with a virtualized view of the operating system 108. This virtualization provided by virtualization layer 112 can associate virtual identifiers (e.g., identifiers 106a) with operating system resources identifiers 114 such as process identifiers and network addresses. Hence, processes (e.g., processes 104a) in a pod (e.g., pod 102a) can be decoupled from dependencies on the operating system 108 and from other processes (e.g., processes 104b) in the system. This virtualization can be integrated with a checkpoint-restart mechanism that enables processes within a pod to be migrated as a unit to another machine. This virtualization scheme can be implemented to virtualize any suitable operating systems, including, but not limited to, Unix, Linux, and Windows operating systems. This virtualization scheme can be, for example, implemented as a loadable kernel module in Linux.

The private, virtual namespace of pods enables secure isolation of applications by providing complete mediation to operating system resources. Pods can restrict what operating system resources are accessible within a pod by simply not providing identifiers to such resources within its namespace. A pod only needs to provide access to resources that are needed for running those processes within the pod. It does not need to provide access to all resources to support a complete operating system environment. An administrator can configure a pod in the same way one configures and installs applications on a regular machine. Pods enforce secure isolation to prevent exploited pods from being used to attack the underlying host or other pods on the system. Similarly, the secure isolation allows one to run multiple pods from different organizations, with different sets of users and administrators on a single host, while retaining the semantic of multiple distinct and individually managed machines.

For example, to provide a web server, a web server pod can be setup to only contain the files the web server needs to run and the content it wants to serve. The web server pod could have its own IP address, decoupling its network presence from the underlying system. The pod can have its network access limited to client-initiated connections using firewall software to restrict connections to the pod's IP address to only the ports served by applications running within this pod. If the web server application is compromised, the pod limits the ability of an attacker to further harm the system because the only resources he has access to are the ones explicitly needed by the service. The attacker cannot use the pod to directly initiate connections to other systems to attack them since the pod is limited to client-initiated connections. Furthermore, there is no need to carefully disable other network services commonly enabled by the operating system to protect against the compromised pod because those services, and the core operating system itself, reside outside of the pod's context.

Pod virtualization can be provided using a system call interposition mechanism and the chroot utility with file system stacking. Each pod can be provided with its own file system namespace that can be separate from the regular host file system. While chroot can give a set of processes a virtualized file system namespace, there may be ways to break out of the environment changed by the chroot utility, especially if the chroot system call is allowed to be used by processes in a pod. Pod file system virtualization can enforce the environment changed by the chroot utility and ensure that the pod's file system is only accessible to processes within the given pod by using a simple form of file system stacking to implement a barrier. File systems can provide a permission function that determines if a process can access a file.

For example, if a process tries to access a file a few directories below the current directory, the permission function is called on each directory as well as the file itself in order. If any of the calls determine that the process does not have permission on a directory, the chain of calls ends. Even if the permission function determines that the process has access to the file itself, it must have permission to traverse the directory hierarchy to the file to access it. Therefore, a barrier can be implemented by stacking a small pod-aware file system on top of the staging directory that overloads the underlying permission function to prevent processes running within the pod from accessing the parent directory of the staging directory, and to prevent processes running only on the host from accessing the staging directory. This effectively confines a process in a pod to the pod's file system by preventing it from ever walking past the pod's file system root.

Any suitable network file system, including Network File System (NFS), can be used with pods to support migration. Pods can take advantage of the user identifier (UID) security model in NFS to support multiple security domains on the same system running on the same operating system kernel. For example, since each pod can have its own private file system, each pod can have its own /etc/passwd file that determines its list of users and their corresponding UIDs. In NFS, the UID of a process determines what permissions it has in accessing a file.

Pod virtualization can keep process UIDs consistent across migration and keep process UIDs the same in the pod and operating system namespaces. However, because the pod file system is separate from the host file system, a process running in the pod is effectively running in a separate security domain from another process with the same UID that is running directly on the host system. Although both processes have the same UID, each process is only allowed to access files in its own file system namespace. Similarly, multiple pods can have processes running on the same system with the same UID, but each pod effectively provides a separate security domain since the pod file systems are separate from one another. The pod UID model supports an easy-to-use migration model when a user may be using a pod on a host in one administrative domain and then moves the pod to another. Even if the user has computer accounts in both administrative domains, it is unlikely that the user will have the same UID in both domains if they are administratively separate. Nevertheless, pods can enable the user to run the same pod with access to the same files in both domains.

Suppose the user has UID 100 on a machine in administrative domain A and starts a pod connecting to a file server residing in domain A. Suppose that all pod processes are then running with UID 100. When the user moves to a machine in administrative domain B where he has UID 200, he can migrate his pod to the new machine and continue running processes in the pod. Those processes can continue to run as UID 100 and continue to access the same set of files on the pod file server, even though the user's real UID has changed. This works, even if there's a regular user on the new machine with a UID of 100. While this example considers the case of having a pod with all processes running with the same UID, it is easy to see that the pod model supports pods that may have running processes with many different UIDs.

Because the root UID 0 may be privileged and treated specially by the operating system kernel, pod virtualization may treat UID 0 processes inside of a pod specially as well. This can prevent processes running with privilege from breaking the pod abstraction, accessing resources outside of the pod, and causing harm to the host system. While a pod can be configured for administrative reasons to allow full privileged access to the underlying system, there are pods for running application services that do not need to be used in this manner. Pods can provide restrictions on UID 0 processes to ensure that they function correctly inside of pods.

When a process is running in user space, its UID does not have any affect on process execution. Its UID only matters when it tries to access the underlying kernel via one of the kernel entry points, namely devices and system calls. Since a pod can already provide a virtual file system that includes a virtual/dev with a limited set of secure devices, the device entry point may already be secure. System calls of concern include those that could allow a root process to break the pod abstraction. They can be classified into three categories and are listed below:

Category 1: Host Only System Calls mount—If a user within a pod is able to mount a file system, they could mount a file system with device nodes already present and thus would be able to access the underlying system directly. Therefore, pod processes may be prevented from using this system call.

stime, adjtimex—These system calls enable a privileged process to adjust the host's clock. If a user within a pod could call this system call they can cause a change on the host. Therefore pod processes may be prevented from using this system call.

acct—This system call sets what file on the host BSD process accounting information should be written to. As this is host specific functionality, processes may be prevented from using this system call.

swapon, swapoff—These system calls control swap space allocation. Since these system calls are host specific and may have no use within a pod, processes may be prevented from calling these system calls.

reboot—This system call can cause the system to reboot or change Ctrl-Alt-Delete functionality. Therefore, processes may be prevented from calling it.

ioperm, iopl—These system calls may enable a privileged process to gain direct access to underlying hardware resources. Since pod processes do not access hardware directly, processes may be prevented from making these system calls.

create_nodule, init_nodule, delete_nodule, query_module—These system calls relate to inserting and removing kernel modules. As this is a host specific function, processes may be prevented from making these system calls.

sethostname, setdomainname—These system call set the name for the underlying host. These system calls may be wrapped to save them with pod specific names, allowing each pod to call them independently.

nfsservctl—This system call can enable a privileged process inside a pod to change the host's internal NFS server. Processes may be prevented from making this system call.

Category 2: Root Squashed System Calls nice, setpriority, sched_setscheduler—These system calls lets a process change its priority. If a process is running as root (UID 0), it can increase its priority and freeze out other processes on the system. Therefore, processes may be prevented from increasing their priorities.

ioctl—This system call is a syscall demultiplexer that enables kernel device drivers and subsystems to add their own functions that can be called from user space. However, as functionality can be exposed that enables root to access the underlying host, all system call beyond a limited audited safe set may be squashed to user "nobody," similar to what NFS does.

setrlimit—this system call enables processes running as UID 0 to raise their resource limits beyond what was preset, thereby enabling them to disrupt other processes on the system by using too much resources. Processes may be prevented from using this system call to increase the resources available to them.

mlock, mlockall—These system calls enable a privileged process to pin an arbitrary amount of memory, thereby enabling a pod process to lock all of available memory and starve all the other processes on the host. Privileged processes may therefore be reduced to user "nobody" when they attempt to call this system call so that they are treated like a regular process.

Category 3: Option Checked System Calls mknod—This system call enables a privileged user to make special files, such as pipes, sockets and devices as well as regular files. Since a privileged process needs to make use of such functionality, the system call cannot be disabled. However, if the process creates a device it may be creating an access point to the underlying host system. Therefore when a pod process makes use of this system call, the options may be checked to prevent it from creating a device special file, while allowing the other types through unimpeded.

The first class of system calls are those that only affect the host system and serve no purpose within a pod. Examples of these system calls include those that load and unload kernel modules or that reboot the host system. Because these system calls only affect the host, they would break the pod security abstraction by allowing processes within it to make system administrative changes to the host. System calls that are part of this class may therefore be made inaccessible by default to processes running within a pod.

The second class of system calls are those that are forced to run unprivileged. Just like NFS, pod virtualization may force privileged processes to act as the "nobody" user when they want to make use of some system calls. Examples of these system calls include those that set resource limits and ioctl system calls. Since system calls such as setrtimit and nice can allow a privileged process to increase its resource limits beyond predefined limits imposed on pod processes, privileged processes are by default treated as unprivileged when executing these system calls within a pod. Similarly, the ioctl system call is a system call multiplexer that allows any driver on the host to effectively install its own set of system calls. Pod virtualization may conservatively treat access to this system call as unprivileged by default.

The third class of system calls are calls that are required for regular applications to run, but have options that will give the processes access to underlying host resources, breaking the pod abstraction. Since these system calls are required by applications, the pod may check all their options to ensure that they are limited to resources that the pod has access to, making sure they are not used in a manner that breaks the pod abstraction. For example, the mknod system call can be used by privileged processes to make named pipes or files in certain application services. It is therefore desirable to make it available for use within a pod. However, it can also be used to create device nodes that provide access to the underlying host resources. To limit how the system call is used, the pod system call interposition mechanism may check the options of the system call and only allows it to continue if it is not trying to create a device.

Figure 2:
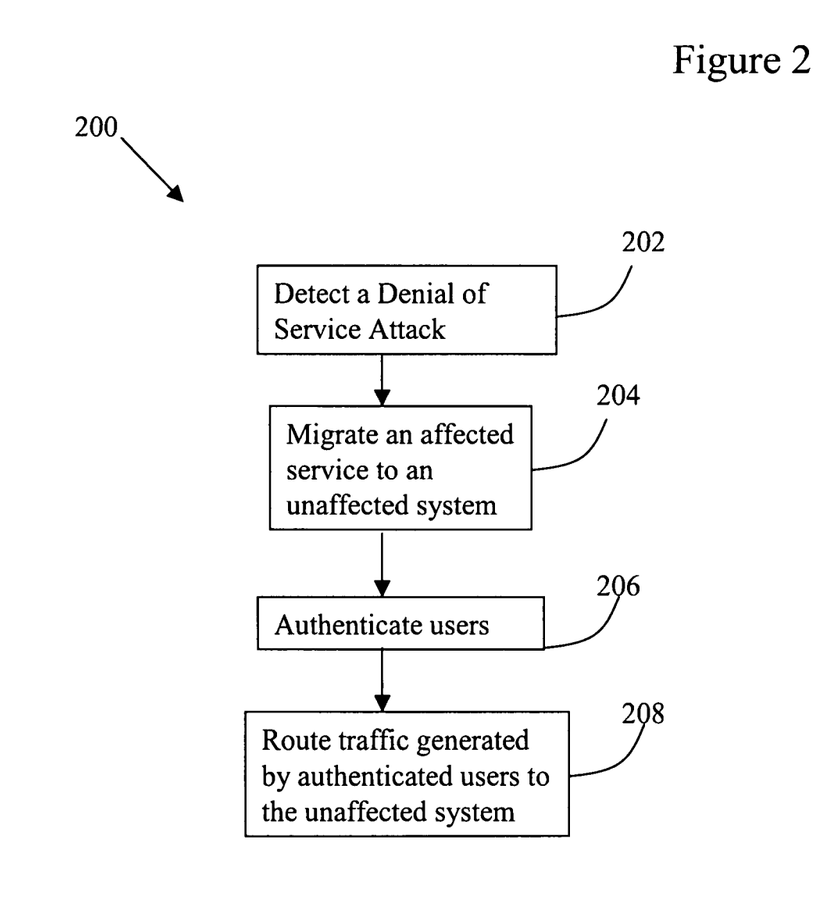
FIG. 2 is a diagram illustrating a method for providing a service in a computer network according to some embodiments.

In some embodiments, checkpoint-restart as shown in FIG. 2 can allow pods to be migrated across machines running different operating system kernels. Upon completion of the upgrade process (e.g., at 210 of method 200), the system and its applications may be restored on the original machine. Pods can be migrated between machines with a common CPU architecture with kernel differences that may be limited to maintenance and security patches.

Many of the Linux kernel patches contain security vulnerability fixes, which are typically not separated out from other maintenance patches. Migration can be achieved where the application's execution semantics, such as how threads are implemented and how dynamic linking is done, do not change. On the Linux kernels, this is not an issue as all these semantics are enforced by user-space libraries. Whether one uses kernel or user threads, or how libraries are dynamically linked into a process can be determined by the respective libraries on the file system. Since the pod may have access to the same file system on whatever machine it is running on, these semantics can stay the same. To support migration across different kernels, a system can use a checkpoint-restart mechanism that employs an intermediate format to represent the state that needs to be saved on checkpoint, as discussed above.

In some embodiments, the checkpoint-restart mechanism can be structured to perform its operations when processes are in such a state that saving on checkpoint can avoid depending on many low-level kernel details. For example, semaphores typically have two kinds of state associated with each of them: the value of the semaphore and the wait queue of processes waiting to acquire the corresponding semaphore lock. In general, both of these pieces of information have to be saved and restored to accurately reconstruct the semaphore state. Semaphore values can be easily obtained and restored through GETALL and SETALL parameters of the semcti system call. But saving and restoring the wait queues involves manipulating kernel internals directly. The checkpoint-restart mechanism avoids having to save the wait queue information by requiring that all the processes be stopped before taking the checkpoint. When a process waiting on a semaphore receives a stop signal, the kernel immediately releases the process from the wait queue and returns EINTR. This ensures that the semaphore wait queues are always empty at the time of checkpoint so that they do not have to be saved.

While most process state information can be abstracted and manipulated in higher-level terms using higher-level kernel services, there are some parts that are not amenable to a portable intermediate representation. For instance, specific TCP connection states like time-stamp values and sequence numbers, which do not have a high-level semantic value, have to be saved and restored to maintain a TCP connection. As this internal representation can change, its state needs to be tracked across kernel versions and security patches. Fortunately, there is usually an easy way to interpret such changes across different kernels because networking standards such as TCP do not change often. Across all of the Linux 2.4 kernels, there was only one change in TCP state that required even a small modification in the migration mechanism. Specifically, in the Linux 2.4.14 kernel, an extra field was added to TCP connection state to address a flaw in the existing syncookie mechanism. If configured into the kernel, syncookies protect an Internet server against a synflood attack. When migrating from an earlier kernel to a Linux-2.4.14 or later version kernel, the extra field can be initialized in such a way that the integrity of the connection is maintained. In fact, this is the only instance across all of the Linux 2.4 kernel versions where an intermediate representation is not possible and the internal state had changed and had to be accounted for.

Systems and methods in some embodiments provide a solution to the denial of service (DoS) problem that does not rely on network infrastructure support, conforming to the end-to-end (e2e) design principle. A system of various embodiments of the present invention, can include an overlay network, which allows preferential treatment of authorized traffic, and a lightweight process-migration environment that allows services (i.e., processes) to move between different parts of a distributed system. Services (e.g., web servers) residing on a system that is subjected to a DoS attack can migrate to an unaffected location. The overlay network can ensure that traffic from legitimate users, who are authenticated before they are allowed to access the service, is routed to the new location. This can be done transparently without requiring efforts on the part of the user. Malicious (or simply unknown) traffic may continue to flow to the old location. According to various embodiments, a filtering perimeter does not need to be constructed around a hosting site. Embodiments of the present invention therefore provide a practical solution to the network DoS problem that does not require significant (or any) cooperation by Internet Service Providers (ISPs). In some embodiments, nodes can be located at edge networks, requiring no infrastructure support.

In some embodiments, a system includes hosting sites that can accept the migrating service. These can be statically provisioned, e.g., through a co-operative agreement among various service providers, or allocated on demand from a commercial entity selling (or renting) CPU time. Services that do not require any state to be maintained can be load-balanced across several sites and contacted using Anycast, RR-DNS, etc. Likewise, content-delivery applications can use data replication services such as Akamai to increase availability.

FIG. 2 is a diagram illustrating a method 200 for providing a service in a computer network in the presence of DoS attacks. As shown, at 202, a service detects a DoS attack. The DoS attack may be detected, for example, by investigating load on the service or network, or by using any other suitable mechanisms. At 204, the service is migrated to an unaffected system. At 206, users can be authenticated and authorized to use the service. At 208, authorized traffic is routed to the unaffected system so that the users continue to use the service.

Figure 3:
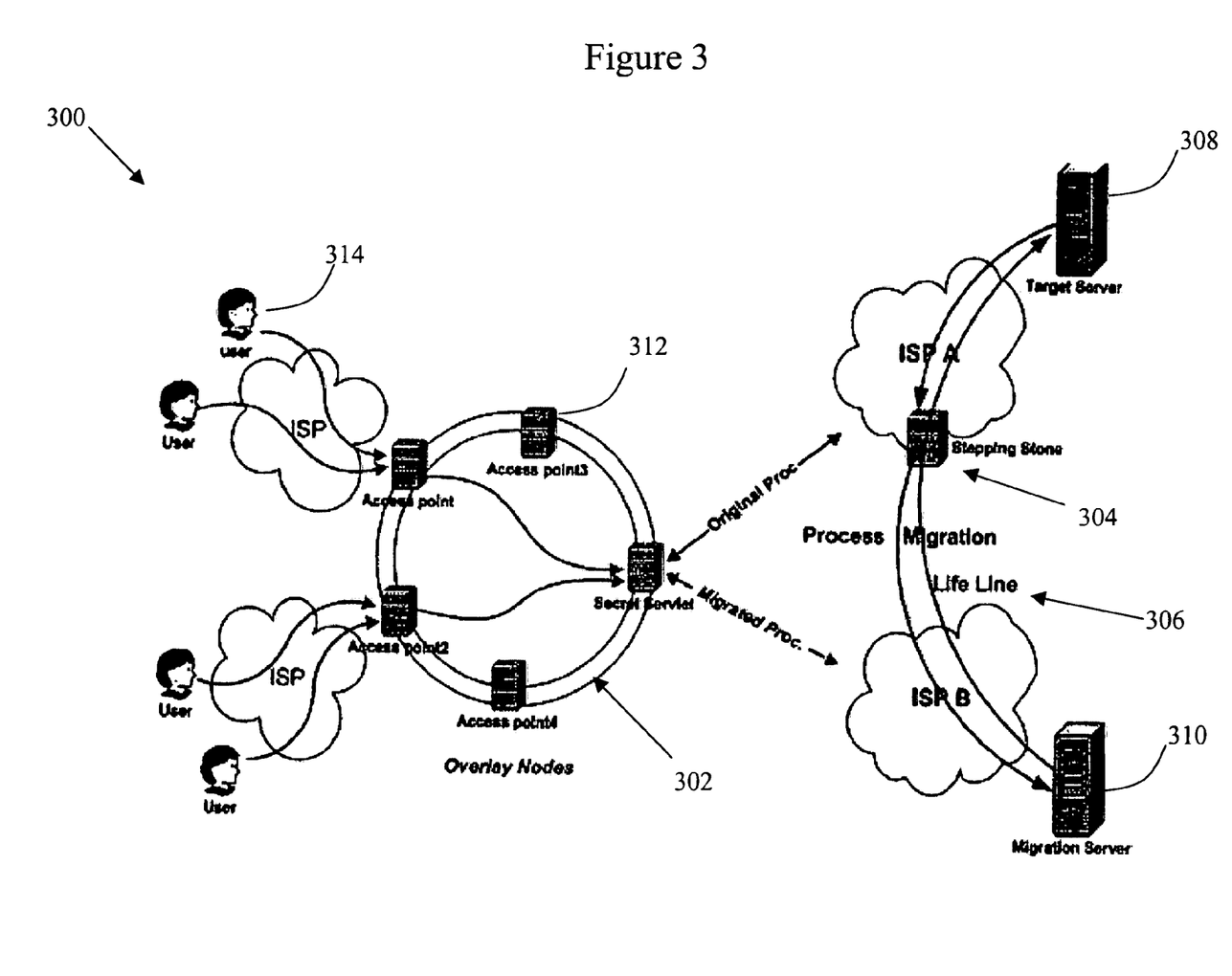
FIG. 3 is a diagram illustrating a system for providing a service in a computer network according to some embodiments.

FIG. 3 is a diagram illustrating a system 300 of various embodiments of the present invention. System 300 includes an overlay network 302, which in turn includes multiple access points (e.g., access point 312). A target server 308 provides a service to be protected (e.g., a web server), which can be migrated to migration server 310. Server 308 can inform overlay network 302 of its current location, so that legitimate user traffic (traffic generated by authorized users) can be routed by network 302 to the server. Users can be authenticated using a standard security protocol such as SSL/TLS with client certificates, or IPsec. When a service migrates to a new location (e.g., from server 308 to 310), it can inform overlay network 302 of its new location. Multiple services, belonging to different organizations, may use the system at the same time. A service may be allowed to change the location status only for itself but not others so that it cannot cause the overlay network to redirect and capture a competitor's traffic. Because service migration itself uses the network, which can be under a DoS attack, a hosting site can use a secondary connection to the Internet with a secondary IP address that is not advertised, e.g., through Border Gateway Protocol (BGP). This secondary connection may be provided by the same ISP or a different ISP, and can be used for migrating the service.

According to various embodiments, system 300 can include "stepping stone" nodes, e.g., node 304, that allow a service in a home ISP network (e.g., ISP A in FIG. 3) to migrate to a host outside of the home ISP network (e.g., migration server 310 in ISP B). The stepping stone nodes can be located in the same home ISP network, but need not be operated by the ISP (i.e., they can be located in end-networks). The stepping stone nodes can be part of overlay network 302 (in which case the nodes can admit new clients and route their traffic), dedicated nodes, hosting sites in the same home ISP network, or any combination of these. The stepping stone nodes can be connected to the attacked hosting site through a private link. For example, the home ISP may internally assign net-10 addresses (i.e., an address in the private 10.0.0.0/8 prefix) for connections between the stepping stones and the hosting sites (the net-10 address for the hosting site may be the secondary IP address mentioned above). During migration, the service binary and state can be saved and transferred to stepping stone node 304, and then to migration server 310, where the service is restarted. After the service notifies overlay network 302 of its new location, network 302 can redirect traffic from legitimate clients to server 310, which is outside of the home ISP network, through stepping stone node 304. Thus, stepping stone node 304 can communicate beyond the home ISP, and with an ISP-specific address of the attacked site. Stepping stone node 304 can use a temporary address that belongs to the ISP, that is globally routable. This address can be changed periodically, such that an attacker cannot target the stepping stone with attack traffic. This way, a one-way communication channel through the stepping stone node is created, because from the hosting site's perspective, outside connections through the stepping node are possible, while incoming ones are not.

According to various embodiments, system 300 can also maintain a "lifeline" connection 306 between the new location (migration server 310) and the old location (target server 308) via stepping stone node 304, such that the migrated service at migration server 310 can access any storage that is attached to the old location.

Figure 4:
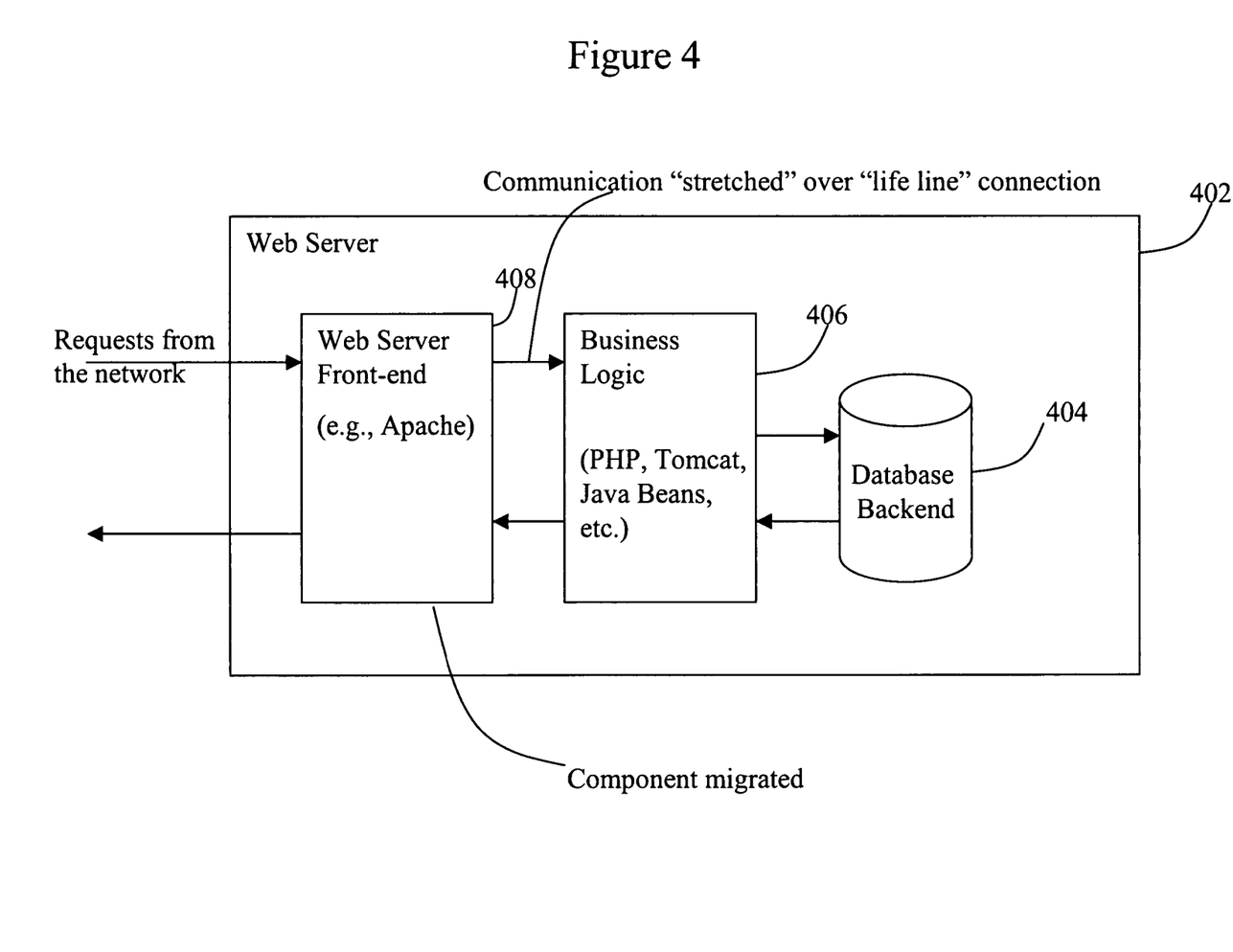
FIG. 4 is block diagram illustrating a component that can be used in a system for providing a service in a computer network according to some embodiments.

For example, consider a typical web server 402 shown in FIG. 4. Web server 402 can include a web server front-end 408, which can be an Apache server. The front-end server 408 can access business logic component 406, which in turn can access database backend component 404, for processing user requests. After front-end server 408 has been migrated, lifeline connection 406 can be "stretched" and used by the migrated service to communicate to the business logic and database components 406, 404. Although the stepping stone's address may change over time, tunneling can be used to maintain the connection between front-end server 408 and components 406, 404. In some embodiments, the Stream Control Transmission Protocol (SCTP) can be used for this connection, which allows live-connection migration to a new IP address. Because the lifeline connection 406 is private, a DoS attack will not affect the lifeline. To avoid adding to the lifeline overheads when a service is migrated several times, the lifeline may be collapsed by instructing a previous (original) stepping stone to connect to the new location.

The following describes approaches for performing the act of authenticating users 206 in method 200. Users that want to access the attacked service may contact an overlay network node (an updated list of which can be published periodically) and authenticate using one of several techniques. For example, authentication may be performed using Secure Sockets Layer (SSL) with client certificates (e.g., X.509 certificates) that are signed by the entity operating the overlay network, and the holders of the certificates can be authorized to access a specific service or a range of services using the overlay network. Such an authentication protocol may require advance knowledge of who the legitimate users are, so they can be provisioned with the appropriate authentication credentials.

Figure 5:
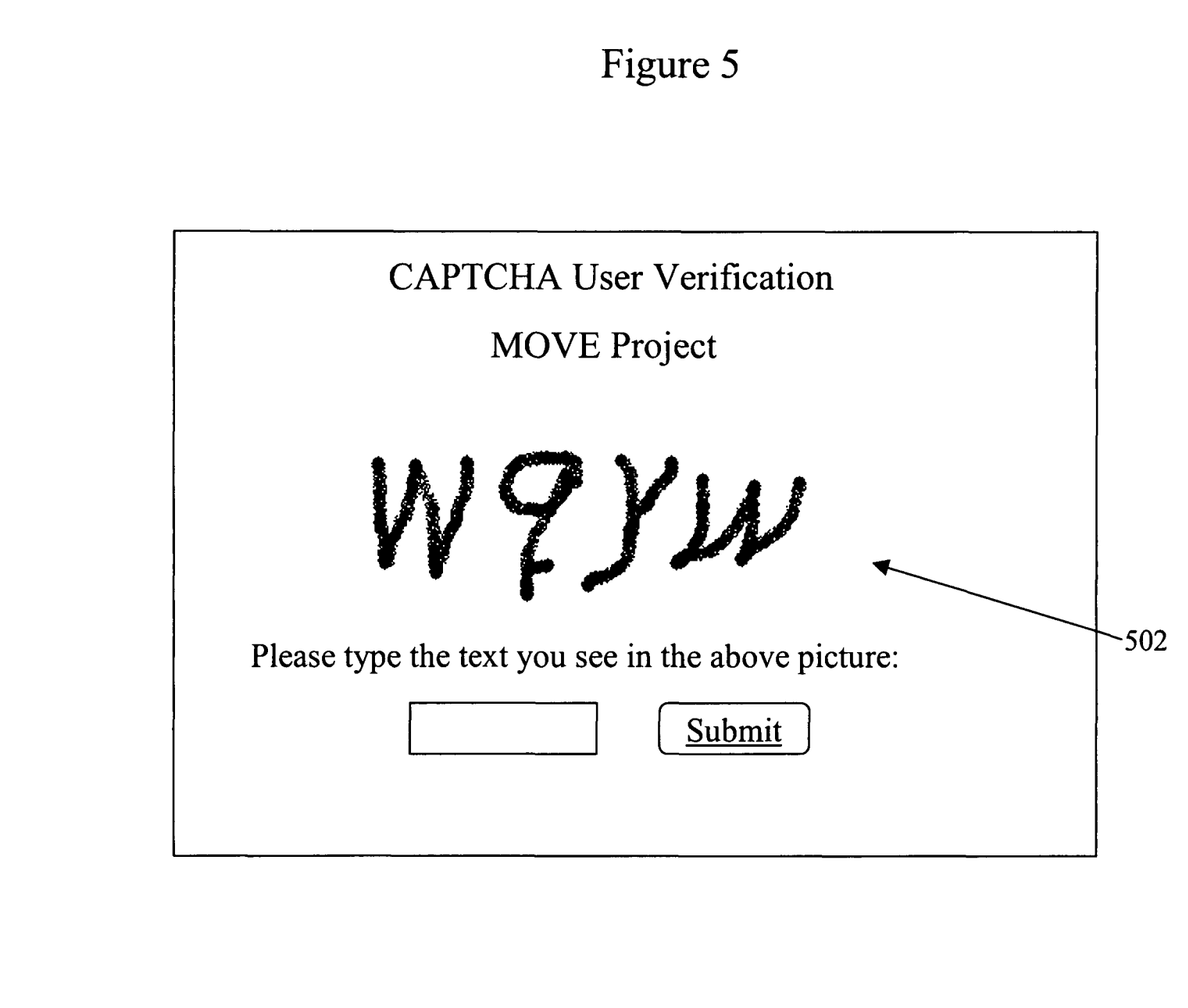
FIG. 5 is a diagram illustrating a user authentication scheme.

In countering DoS attacks, however, it is often enough if all human users can be authenticated. If a particular request (e.g., HTTP connection) originated from a human user rather than from a "DoS zombie" process under the control of the attacker, the request can be authorized. Therefore, another authentication technique that can be used is a Graphic Turing Test (GTT), an example of which is GIMPY, a test shown in FIG. 5. GIMPY renders a distorted image 502 of a sequence of letters. GIMPY relies on the fact that humans can read the words within the distorted image 502 and automated tools typically cannot. The human authenticates by entering as ASCII text the same sequence of letters as what appears in the image. In addition to GIMPY, any other suitable GTT mechanisms can be used. Once a client has passed the GTT, they can be provided with a short-expiration certificate that can be used to access the overlay network with Transport Layer Security (TLS). For vision-impaired users, it is possible to use audible tests of a similar nature (e.g., asking a user to type the word that is spelled in an audio clip). Both certificate authenticated and GTT-admitted clients can be supported simultaneously, and/or any other suitable authentication mechanisms.

Authenticated clients route all their traffic over the overlay network, which redirects it to the current location of the protected service. The actual location of a service is no longer implied by the host-name component of the Uniform Resource Locator (URL), or the IP address it resolves to. An attacker that has no access to the overlay network can try to attack a hosting site at random, or the IP address the URL resolves to. In that case, the service and all associated state is migrated to a new location. Alternatively, the attacker can target the overlay network itself, but doing so is more difficult as the overlay network size increases. It is expected that 15 to 20 distinct and well connected hosting sites and a small number of stepping stone nodes for each can be sufficient in making even large attacks infeasible, although any other number of suitable sites and nodes can be used.

Figure 6:
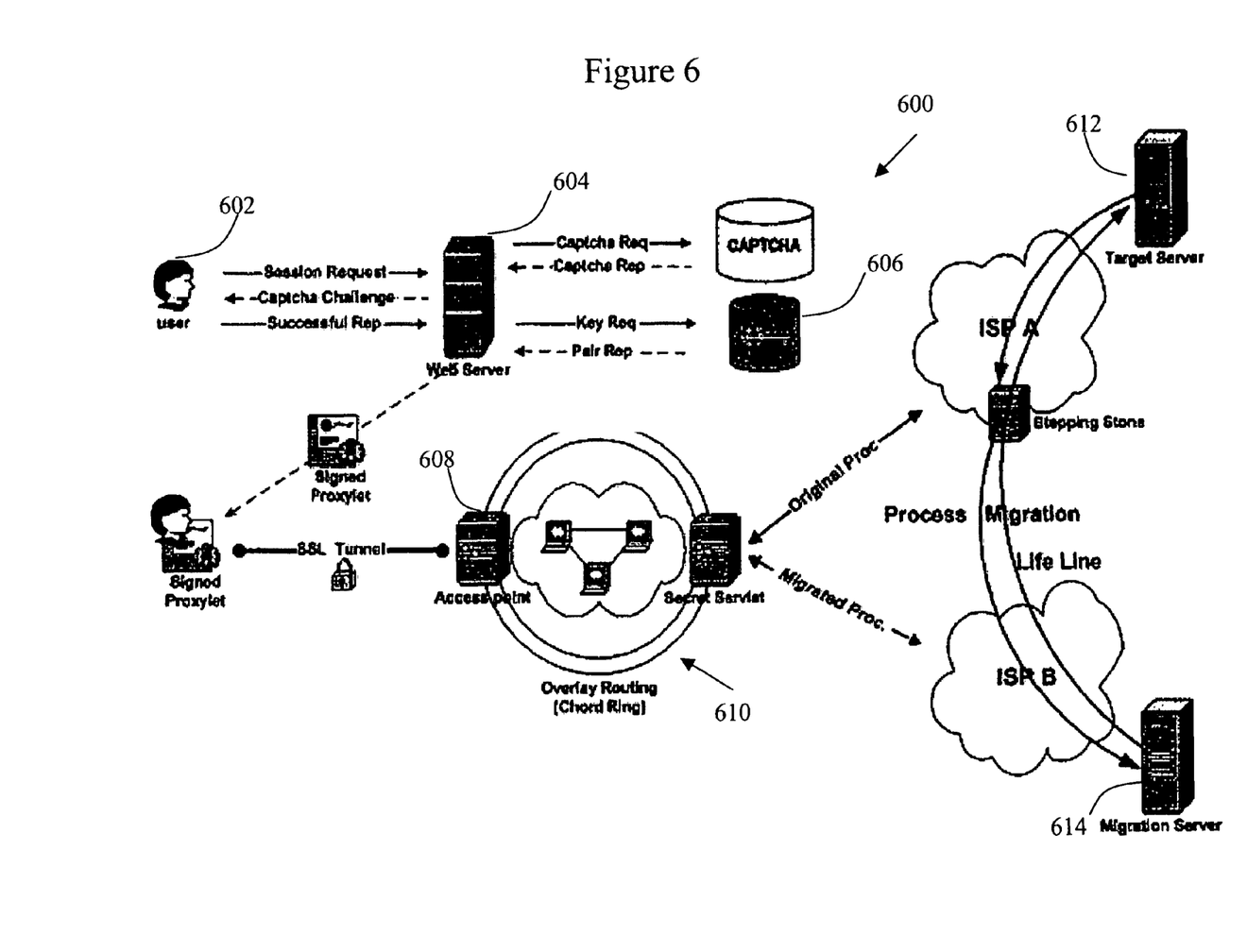
FIG. 6 is a diagram illustrating another system for providing a service in a computer network according to some embodiments, including a user authentication mechanism.

FIG. 6 is a diagram illustrating another system 600 for providing a service in the presence of DoS attacks, and a user authentication mechanism, according to some embodiments. System 600 can include overlay network 610, target server 612, and migration server 614. A web server 604, which can be an access point in overlay network 610, can be used for authenticating users. Overlay network 610 may be implemented, for example, using Chord, which can be viewed as a routing service atop the existing IP network fabric. Consistent hashing can be used to map an arbitrary identifier to a unique destination node that is an active member of the overlay network. In Chord, each node is assigned a numerical identifier (ID) via a hash function in the range $[0.2^m]$ for some predetermined value of m. The nodes in the overlay are ordered by these identifiers. The ordering is cyclic (i.e., wraps around) and can be viewed conceptually as a circle, where the next node in the ordering is the next node along the circle in the clockwise direction. Each overlay node maintains a table that stores the identities of m other overlay nodes. The $i^{th}$ entry in the table is the node whose identifier x equals or, in relation to all other nodes in the overlay, most immediately follows $x+2^{i-1}$ (mod $2^m$). When overlay node x receives a packet destined for ID y, it forwards the packet to the overlay node in its table whose ID precedes y by the smallest amount. The Chord algorithm routes packets around the overlay "circle", progressively getting closer to the desired overlay node. O(m) overlay nodes are visited. Typically, the hash functions used to map nodes to identifiers do not attempt to map two geographically close nodes to nearby identifiers. Hence, it is often the case that two nodes with consecutive identifiers are geographically distant from one another within the network. The Chord service is robust to changes in overlay membership, and each node's list is adjusted to account for nodes leaving and joining the overlay such that the above properties continue to hold.

In some embodiments, the hostname of target server 612 (e.g., a web server) can be used as the identifier to which the hash function is applied. Thus, Chord can direct traffic from any node in overlay network 610 to the node that the identifier is mapped to, by applying the hash function to the target's host name. This node is simply a unique node that will be eventually be reached, after up to m=log N overlay hops, regardless of the entry point. For any particular service, this node will always know its current location. If this node is for some reason dropped from the overlay network, a new node (the one with an address closest to the hash of the service's hostname) will subsume its role, and provide location-resolution services for that target. The new node will learn of the service's current location through the periodic re-confirmation message sent. Thus, location information does not need to be flooded to all nodes of the overlay network, which would make it difficult to support large numbers of services, without compromising reliability and robustness to attack.

In some embodiments, overlay network 610 can be built based on WebSOS, which is an adaptation of Secure Overlay Services (SOS). Each overlay node can be responsible for resolving the location of the requested service and creating a security communication tunnel with it. To that end, Chord can be used to distribute the location information for each site: when a service informs the system of its current location, its hostname can be hashed and the node thus indicated is informed of the location. In that sense, this node acts in a manner analogous to SOS beacon nodes. Similarly, when a node needs to forward a legitimate user's request to the service, it can hash the service hostname and send a query to the Chord node whose address is closest to the hash result. Thus, rather than transporting the request and response through the Chord overlay network, only routing information travels through it; data connections can be proxied directly to the protected service's location. The information can be cached and periodically refreshed by consulting the authoritative node for that target.

When a new request (in the form of a new TCP connection) is received, the node to which the client is connected (called an access point) can first check the local cache database for the current location of the requested service. If the lookup succeeds, the access point can open a new SSL connection to a random overlay node (to borrow from SOS terminology, a "secret servlet"). This avoids some of the eavesdropping attacks. Thus, a two-way communication channel can be established between the client and the service, through the overlay network. Authentication of the user by the overlay can be accomplished through SSL. Authorized users can be issued X.509 certificates signed by the access point that administered the GTT. These certificates may only be valid for a limited time (30 minutes), after which the user may be required to pass another GTT. Furthermore, the certificates may be bound to the IP address from which the GTT authentication came, and can only be used with the specific access point. Thus, an attacker cannot simply authenticate once and redistribute the same certificate to a large number of attack zombies. Each overlay node can also communicate with other system nodes over SSL connections. If the lookup fails, the access point can query the resolving node, as described previously.

When a request is issued by the client for a specific service, it can be tunneled through a series of SSL-encrypted links to the target, allowing the entire transmission between the requester and target to be encrypted. The SSL connections between nodes can be dynamically established, as new requests are routed. To accomplish this, a port forwarder that runs on the user's system can accept plain-text proxy requests locally, and forward them using SSL to the access point node. This can be implemented as a Java applet that runs inside the browser that a user uses to authenticate himself. This Java applet can be responsible for encrypting and forwarding to the access point requests from any service initiated by the client and can be configured to accept a proxy. This last requirement can be removed if interception of the socket communication at the operating system level is used.

Thus, an authorized user can access any access point, successfully respond to the GTT challenge, download the applet, and set the service proxy settings to the localhost, as shown in FIG. 6. If user 602 replies to the GTT successfully, web server 604 connects to a Database Management System (DBMS) system 606 (local or remote) and associates an RSA key and a certificate with server 604. The key/certificate may be unique per IP address and have an expiration time that can be configured by the system administrator. User 602 can then be prompted to download a signed applet that runs locally using one browser window and contact web server 604 via a temporary HTTPS connection to fetch the X.509 certificate. The applet may then start listening for service connections on a local ports (e.g., 8080) and establish an SSL-tunnel connection with a proxy server 608 running on the access point (or elsewhere, because the signed applet has the ability to connect to any server by changing the Java Policy files on the users' machine). Proxy server 608 can then match the X.509 certificate and the IP address from client to the private key obtained from the DBMS system and allow the connection to be proxied. The only imposition on the user is that he/she must change the Proxy settings of the local browser to point to the socket that listens for the applets.

The access points can cache the server's location for use in future requests. That information can be timed out after a period of time to allow changes to propagate correctly. The same basic mechanism can be used by services to announce their presence to (and periodically update the information stored by) their corresponding resolving nodes.

In a DoS attack, the target server can migrate to a randomly chosen location and, once there, can notify the overlay network of its new location. The migration can be performed using the process migration mechanism. This mechanism can be used to load and save the services (e.g., Apache and VNC servers) respectively, creating the necessary images of the running processes. These process images, which included the current process state, can then be transferred to the remote server and restarted.

Although some examples presented above relate to the Linux operating system, it will be apparent to a person skilled in the field that various embodiments can be implemented and/or used with any other operating systems, including, but not limited to, Unix and Windows operating systems. In addition, various embodiments are not limited to providing services in a computer network, but can be used to provide services in any suitable network of digital processing devices. Digital processing devices can include, for example, computers, set-top boxes, mobile computing devices such as cell phones and PDAs, other embedded systems, and/or any other suitable device.

Other embodiments, extensions, and modifications of the ideas presented above are comprehended and within the reach of one skilled in the field upon reviewing the present disclosure. Accordingly, the scope of the present invention in its various aspects is not to be limited by the examples and embodiments presented above. The individual aspects of the present invention, and the entirety of the invention are to be regarded so as to allow for modifications and future developments within the scope of the present disclosure. The present invention is limited only by the claims that follow.

What is claimed is:

1. A method for responding to a Denial of Service (DoS) attack, comprising:
   detecting the denial of service attack;
   migrating one or more processes, that provide a service to a client, and that are running on a target server, from the target server to a migration server in response to the detecting of the denial of service attack by:
      saving information regarding the one or more processes at the target server;
      transferring the saved information to the migration server from the target server using an unpublicized link; and
      restarting the one or more processes on the migration server using the saved information;
   identifying users as not being sources of the denial of service attack by authenticating users that are authorized to use the service;
   routing traffic generated by users identified as not being sources of the denial of service attack to the migration server; and
   periodically changing an IP address associated with the unpublicized link.

2. The method of claim 1, wherein the migrating comprises migrating the one or more processes from a first virtualized operating system environment to a second virtualized operating system environment.

3. The method of claim 1, wherein the authenticating comprises authenticating by digital certificates.

4. The method of claim 1, wherein the authenticating comprises authenticating human users by Graphical Turing Tests.

5. The method of claim 1, wherein the service is a web server.

6. A non-transitory computer-readable medium containing computer-executable instructions that, when executed by a processor, cause the processor to perform a method for responding to a DoS attack, comprising:
   detecting the denial of service attack;
   migrating one or more processes, that provide a service to a client, and that are running on a target server, from the target server to a migration server in response to the detecting of the denial of service attack by:
      saving information regarding the one or more processes at the target server;
      transferring the saved information to the migration server from the target server using an unpublicized link; and
      restarting the one or more processes on the migration server using the saved information;
   identifying users as not being sources of the denial of service attack by authenticating users that are authorized to use the service;
   routing traffic generated by users identified as not being sources of the denial of service attack to the migration server; and
   periodically changing an IP address associated with the unpublicized link.

7. The computer-readable medium of claim 6, wherein the one or more processes are migrated from a first virtualized operating system environment to a second virtualized operating system environment.

8. The computer-readable medium of claim 6, wherein the authenticating comprises authenticating by digital certificates.

9. The computer-readable medium of claim 6, wherein the authenticating comprises authenticating human users by Graphical Turing Tests.

10. A system for responding to a DoS attack, comprising:
    a migration system configured to migrate one or more processes, that provide a service to a client, and that are running on a target server from the target server to a migration server when the target server is affected by the denial of service attack, in response to the detecting of the denial of service attack by:
       saving information regarding the one or more processes at the target server;
       transferring the saved information to the migration server from the target server using an unpublicized link, wherein an IP address associated with the unpublicized link is periodically changed; and
       restarting the one or more processes on the migration server using the saved information; and
    an overlay network configured to identify users as not being sources of the denial of service attack by authenticating authorized users and route traffic from the users identified as not being sources of the denial of service attack to the migration server.

11. The system of claim 10, wherein the service is a web server.

12. The system of claim 10, wherein, after the one or more processes is migrated, the migration server is configured to access a storage unit using the unpublicized link, and wherein the storage unit is used by the one or more processes before migration.

13. The system of claim 10, wherein the target server and the migration server are located in two different networks provided by different Internet Service Providers.

* * * * *